(12) United States Patent
Murthy et al.

(10) Patent No.: US 11,587,029 B2
(45) Date of Patent: Feb. 21, 2023

(54) DETERMINING PRODUCT PLACEMENT COMPLIANCE

(71) Applicant: Kellogg Company, Battle Creek, MI (US)

(72) Inventors: Ganapa Sashidhara Murthy, Portage, MI (US); Daniel Brian Yousef, Hudsonville, MI (US); Eric Kanagy, Battle Creek, MI (US)

(73) Assignee: Kellogg Company, Battle Creek, MI (US)

( * ) Notice: Subject to any disclaimer, the term of this patent is extended or adjusted under 35 U.S.C. 154(b) by 99 days.

(21) Appl. No.: 16/825,470

(22) Filed: Mar. 20, 2020

(65) Prior Publication Data

US 2020/0219046 A1  Jul. 9, 2020

Related U.S. Application Data

(63) Continuation of application No. 15/464,777, filed on Mar. 21, 2017, now Pat. No. 10,643,177.

(51) Int. Cl.
*G06Q 10/08* (2012.01)
*G06T 7/00* (2017.01)
(Continued)

(52) U.S. Cl.
CPC ........... *G06Q 10/087* (2013.01); *G06T 7/001* (2013.01); *G06V 10/44* (2022.01); *G06T 2207/10024* (2013.01); *G06T 2207/30128* (2013.01)

(58) Field of Classification Search
CPC ..... G06Q 10/087; G06K 9/4604; G06V 10/44
See application file for complete search history.

(56) References Cited

U.S. PATENT DOCUMENTS 8,577,136 B1 * 11/2013 Ascher ................ G06Q 10/087
382/165
9,031,872 B1   5/2015 Foster
(Continued)

FOREIGN PATENT DOCUMENTS

CA    2950801 A1    6/2017
EP    2662831 A2    11/2013
(Continued)

OTHER PUBLICATIONS

Office Action, Application No. CA3,057,073, dated Feb. 9, 2021, 5 pages.

(Continued)

*Primary Examiner* — Florian M Zeender
*Assistant Examiner* — Vanessa Deligi
(74) *Attorney, Agent, or Firm* — Honigman LLP; Brett A. Krueger

(57) ABSTRACT

A method for product compliance includes receiving, at data processing hardware, a planogram defining a representative placement of a product on a display shelf and receiving at least one image from an imaging device having a field of view arranged to capture a top surface of the display shelf. The method also includes determining whether the product is disposed on the display shelf based on the at least one image. When the product is disposed on the display shelf, the method includes determining an actual placement of the product on the display shelf and comparing the actual placement of the product to the representative placement of the product defined by the planogram. The method further includes determining a planogram compliance based on the comparison of the actual placement of the product to the representative placement of the product and communicating the planogram compliance to a network.

24 Claims, 11 Drawing Sheets

(51) Int. Cl.
  *G06V 10/44* (2022.01)
  *G06Q 10/087* (2023.01)

(56) References Cited

U.S. PATENT DOCUMENTS

| | | | | |
|---|---|---|---|---|
| 9,129,277 | B2* | 9/2015 | MacIntosh | G06T 7/0004 |
| 9,672,226 | B2* | 6/2017 | Lu | G06V 10/255 |
| 2008/0062262 | A1* | 3/2008 | Perron | G01V 5/0008 |
| | | | | 348/E7.001 |
| 2009/0059270 | A1* | 3/2009 | Opalach | G06K 9/00 |
| | | | | 358/1.15 |
| 2009/0063307 | A1* | 3/2009 | Groenovelt | G06Q 10/087 |
| | | | | 705/28 |
| 2010/0054605 | A1* | 3/2010 | Molnar | H04M 1/2755 |
| | | | | 382/190 |
| 2013/0235206 | A1 | 9/2013 | Smith et al. | |
| 2014/0006117 | A1* | 1/2014 | Kritt | G06Q 30/0241 |
| | | | | 705/14.4 |
| 2015/0088703 | A1* | 3/2015 | Yan | G06Q 10/087 |
| | | | | 705/28 |
| 2016/0042527 | A1* | 2/2016 | Kim | G06V 10/235 |
| | | | | 382/195 |
| 2016/0171707 | A1* | 6/2016 | Schwartz | G06V 20/52 |
| | | | | 382/180 |
| 2016/0224857 | A1 | 8/2016 | Zhang et al. | |
| 2017/0147881 | A1 | 5/2017 | Booth | |
| 2017/0160078 | A1* | 6/2017 | Nishikawa | G06V 10/443 |
| 2017/0178060 | A1* | 6/2017 | Schwartz | G06V 10/44 |
| 2017/0178227 | A1* | 6/2017 | Graham | G06Q 30/0643 |
| 2018/0061052 | A1* | 3/2018 | Bedi | G06F 3/04845 |
| 2018/0068256 | A1* | 3/2018 | Marder | G06Q 10/087 |
| 2018/0075748 | A1* | 3/2018 | Park | B60Q 5/006 |
| 2018/0150058 | A1* | 5/2018 | Shapiro | G06V 10/40 |
| 2018/0165711 | A1* | 6/2018 | Montemayor | G06Q 30/0255 |
| 2020/0151463 | A1* | 5/2020 | Yasunaga | G06K 9/00771 |
| 2021/0110150 | A1* | 4/2021 | Kakrana | G06V 30/412 |

FOREIGN PATENT DOCUMENTS

| | | | |
|---|---|---|---|
| EP | 3096271 A1 | 11/2016 | |
| JP | 2003230131 A | 8/2003 | |
| JP | 2010226157 A | 10/2010 | |
| JP | 2015156211 A | 8/2015 | |
| JP | 2016042307 A | 3/2016 | |
| JP | 2017004505 A | 1/2017 | |
| WO | 20090027839 A1 | 3/2009 | |
| WO | 2013089042 A1 | 6/2013 | |
| WO | 2016019352 A2 | 2/2016 | |
| WO | 2016179065 A1 | 11/2016 | |
| WO | 2016205629 A1 | 12/2016 | |
| WO | WO-2016205629 A1 * | 12/2016 | H04W 4/80 |

OTHER PUBLICATIONS

Office Action, Japanese Application No. 2019-552273, dated Mar. 16, 2021, 10 pages.

International Preliminary Report On Patentability, PCT/US2018/022671, dated Oct. 3, 2019, 9 pages.

Asari et al, "A Pipelined Architecture for Real-Time Correction of Barrel Distortion in Wide-Angle Camera Images," IEEE article, vol. 15, No. 3, Mar. 2005, 9 pages.

Office Action, Application No. 187160494, dated Jul. 1, 2021, 6 pages.

Japanese Office Action, Application No. 2019-552273, dated Oct. 3, 2020 4 pages.

* cited by examiner

DETERMINING PRODUCT PLACEMENT COMPLIANCE

CROSS REFERENCE TO RELATED APPLICATIONS

This U.S. patent application is a continuation of, and claims priority under 35 U.S.C. § 120 from, U.S. patent application Ser. No. 15/464,777, filed on Mar. 21, 2017. The disclosure of this prior application is considered part of the disclosure of this application and is hereby incorporated by reference in its entirety.

TECHNICAL FIELD

This disclosure relates to retail product storage management and determining product placement compliance.

BACKGROUND

Retailers have long used various stocking techniques and retail strategies to attract consumers and to sell inventory. One of these techniques is a planogram. Planograms are an integral part of merchandising today, as a planogram seeks to optimize product placement and to maintain an awareness of inventory management. Planograms are vastly used throughout the retail industry ranging from small retailers to big-box stores. Planograms are generally diagrams that map an arrangement of products within a retail space. Retailers use planograms as a tool to understand product sales and capitalize on visual focal points of a consumer. Planograms may enable a retailer to create a focal point, understand a focal point, and, thus, utilize a focal point to increase sales. A planogram can also provide an analytical tool for product distributors to evaluate what products to carry and for manufactures to understand the desirability of new or mature products in the market. While known systems and methods of retail product storage management have proven acceptable for their intended purpose, a continuous need for improvement in the relevant art remains.

SUMMARY

One aspect of the disclosure provides a method for product compliance. The method includes receiving, at data processing hardware, a planogram defining a representative placement of a product on a display shelf and receiving, at the data processing hardware, at least one image from an imaging device having a field of view arranged to capture a top surface of the display shelf. The method also includes determining, by the data processing hardware, whether the product is disposed on the display shelf based on the at least one image. When the product is disposed on the display shelf, the method includes determining, by the data processing hardware, an actual placement of the product on the display shelf and comparing, by the data processing hardware, the actual placement of the product to the representative placement of the product defined by the planogram. The method further includes determining, by the data processing hardware, a planogram compliance based on the comparison of the actual placement of the product to the representative placement of the product and communicating, from the data processing hardware, the planogram compliance to a network.

Implementations of the disclosure may include one or more of the following optional features. In some implementations, when the product is absent from the display shelf, the method includes determining, by the data processing hardware, a stocking status of the product as being out-of-stock. When the product is disposed on the display shelf, the method may include determining, by the data processing hardware, the stocking status of the product as being in-stock. The method may also include communicating, from the data processing hardware, the stocking status of the product to the network.

When the product is disposed on the display shelf, the method may include determining, by the data processing hardware, a quantity of the product on the display shelf and communicating, from the data processing hardware, the quantity of the product to the network. The method may also include communicating, from the data processing hardware, the actual placement of the product to the network. The top surface of the display shelf may define a pattern of features, the at least one image depicting at least a portion of the top surface of the display shelf. Determining whether the product is disposed on the display shelf may include determining a quantity of exposed features on the top surface of the display shelf captured in the at least one image. Determining the actual placement of the product on the display shelf may include identifying corresponding locations of the exposed features on the top surface of the display shelf captured in the at least one image.

In some examples, the method includes detecting, by the data processing hardware, edges of the exposed features in the at least one image and approximating, by the data processing hardware, the exposed features based on the detected edges of the exposed features. The method may also include comparing, by the data processing hardware, the approximated exposed features to the pattern of features and determining, by the data processing hardware, whether the approximated exposed features correspond to actual features of the pattern features. For each approximated exposed feature, when the approximated exposed feature corresponds to a respective actual feature of the pattern of features, the method may include incrementing, by the data processing hardware, a count of the quantity of exposed features and identifying, by the data processing hardware, a corresponding location of the actual feature within the pattern of features. At least one feature may define a polygonal shape. The method may further include executing, by the data processing hardware, an image correction routine on the at least one image, the image correction routine correcting at least barrel distortion of the at least one image.

Another aspect of the disclosure provides a system including data processing hardware and memory hardware in communication with the data processing hardware. The memory hardware stores instructions that when executed on the data processing hardware cause the data processing hardware to perform operations. The operations include receiving a planogram defining a representative placement of a product on a display shelf, receiving at least one image from an imaging device having a field of view arranged to capture a top surface of the display shelf, and determining whether the product is disposed on the display shelf based on the at least one image. When the product is disposed on the display shelf, the operations include determining an actual placement of the product on the display shelf and comparing the actual placement of the product to the representative placement of the product defined by the planogram. The operations further include determining a planogram compliance based on the comparison of the actual placement of the product to the representative placement of the product and communicating the planogram compliance from the data processing hardware to a network.

This aspect may include one or more of the following optional features. In some implementations, the operations include when the product is absent from the display shelf, determining a stocking status of the product as being out-of-stock, when the product is disposed on the display shelf, determining the stocking status of the product as being in-stock, and communicating the stocking status of the product from the data processing hardware to the network. When the product is disposed on the display shelf, the operations include determining a quantity of the product on the display shelf and communicating the quantity of the product to the network.

In some examples, the operations include communicating the actual placement of the product from the data processing hardware to the network. The top surface of the display shelf may define a pattern of features, the at least one image depicting at least a portion of the top surface of the display shelf. Determining whether the product is disposed on the display shelf may include determining a quantity of exposed features on the top surface of the display shelf captured in the at least one image. Determining the actual placement of the product on the display shelf may also include identifying corresponding locations of the exposed features on the top surface of the display shelf captured in the at least one image.

In some implementations, the operations include detecting edges of the exposed features in the at least one image and approximating the exposed features based on the detected edges of the exposed features. The operations may also include comparing the approximated exposed features to the pattern of features and determining whether the approximated exposed features correspond to actual features of the pattern features. For each approximated exposed feature, when the approximated exposed feature may correspond to a respective actual feature of the pattern of features, the operations include incrementing a count of the quantity of exposed features and identifying a corresponding location of the actual feature within the pattern of features. At least one feature may define a polygonal shape. In some examples, the operations include executing an image correction routine on the at least one image, the image correction routine correcting at least barrel distortion of the at least one image.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

To stock and to manage inventory, a retailer commonly uses a display shelf environment. The display shelf environment may contain any number of shelves with product often arranged according to a planogram. Yet over time customers or other people within the retail space may move or may change a position of the product with respect to a representative placement of the product according to the planogram. Because a planogram is an important tool created to try to capitalize and to shape the in-store decision making of a consumer, the product arrangement represented in the planogram should reflect the actual product placement of the retailer. The present disclosure provides systems and methods for sensing product placement on a display shelf and providing compliance feedback based on the product placement.

Figure 1:
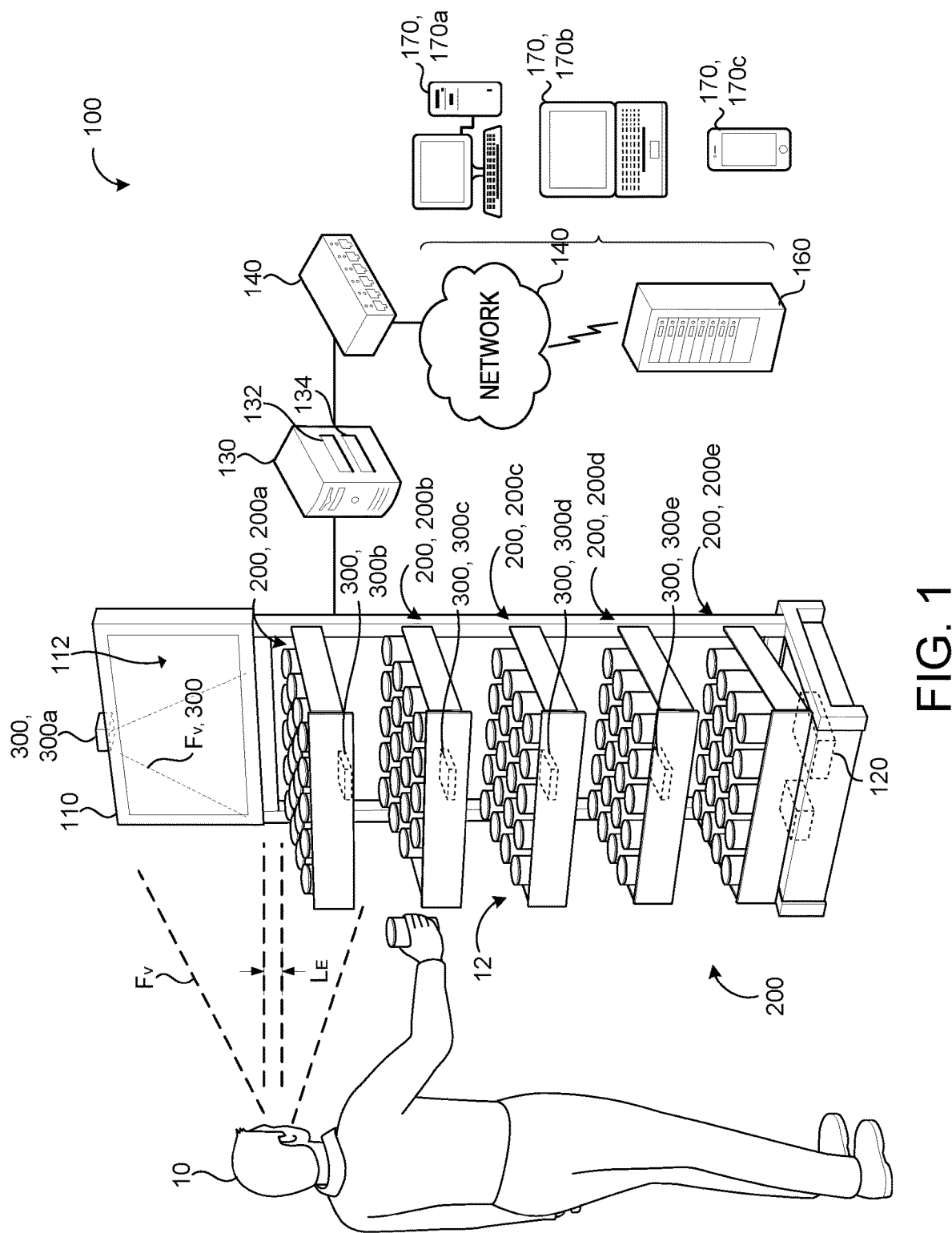
FIG. 1 is a schematic view of an example display shelf environment.

FIG. 1 illustrates a user 10 in an example display shelf environment 100 interacting with a display shelf 200. The display shelf environment 100 includes an imaging device 300 having a field of view $F_v$, 300 to capture the display shelf 200. The user 10 may select a product 12 of the display shelf 200. The user 10 may be a consumer, such as a grocery store shopper, who removes the product 12 from the display shelf 200 to purchase, hold, inspect, or otherwise handle the product 12. Additionally or alternatively, the user 10 may be a retail employee or a distribution representative who stocks the product 12 by placing the product 12 on the display shelf 200. The product 12 of the display shelf 200 may be arranged according to a planogram 500 (e.g., FIG. 5). Generally, a planogram 500 is a diagram that identifies a representative placement $P_R$ of the product 12 to be displayed on the display shelf 200.

In some implementations, the display shelf environment 100 includes a display screen 110 disposed on the display shelf 200. The display screen 110 may depict media content 112, such as advertisements related to the product 12, advertisements related to the manufacturer of the product 12, or advertisements related to a retail store selling the product 12. The media content 112 may be related to a stocking status S of the product 12. For example, if a type of product 12 on the display shelf 200 has a greater amount of stock then another product on the display shelf 200, the media content 112 advertises for the type of product 12 with more stock. Additionally or alternatively, the media content 112 advertises for the type of product 12 with less stock to attempt to maintain an interest of the user 10. In some examples, the display screen 110 is arranged on the display shelf 200 such that the display screen 110 depicts media content 112 within a field of view $F_v$ of the user 10. As an example, the display screen 110 is eye level LE with the user 10. Additionally or alternatively, the display shelf environment 100 includes more than one display screen 110 such that one of the more than one display screens 110 may be used by user 10 as a product monitoring screen. For example, the imaging device 300 provides to the product monitoring screen a real time feed from the imaging device 300 or at least one image 310 (e.g., a most recent image 310).

In some examples, the display shelf environment 100 includes more than one display shelf 200, 200a-e with an imaging device 300, 300a-e for each display shelf 200, 200a-e of the more than one display shelf 200, 200a-e. The more than one display shelf 200, 200a-e may form a display rack to contain more product 12 and/or to optimize actual placement $P_A$ of the product 12. For example, the product 12 of the display rack includes more than one type of product 12. With more than one type of product 12, a retailer may be interested in having a best-selling type of product 12 most accessible to the user 10. With more than one display shelf 200, 200a-e, the retailer may arrange the best-selling type of product 12 on display shelf 200, 200a or display shelf 200, 200b such that the best-selling type of product has an actual placement $P_A$ within the field of view $F_v$ of the user 10 (e.g., 200, 200b) or eye level LE with the user 10 (e.g., 200, 200a).

Referring further to FIG. 1, the display shelf environment 100 includes a power supply 120 and a computing device 130 connected to a network 150. The power supply 120 supplies power to electronics within the display shelf environment 100 (e.g., the display screen 110, the imaging device 300, the computing device 130, etc.). The power supply 120 may be a single unit or multiple units depending on the retailer or configuration of the display shelf environment 100 (e.g., the display shelf 200 or more than one display shelf 200, 200a-e). The computing device 130 includes data processing hardware 132 and memory hardware 134. The computing device 130 may be connected to a network 150 via a switch or router 140. The computing device 130 may send imaging data to the network 150 to be stored on a server 160 accessible to a remote computer 170. The remote computer 170 may be a personal computer 170, 170a, a laptop 170, 170b, or mobile device 170, 170c. For example, the user 10 who is a retailer distributor may use a remote computer 170 to ensure that the display shelf environment 100 of the retailer has continual compliance with the planogram 500. Additionally or alternatively, the network 150 permits one user 10 (e.g., a retailer distributor) to alert another user 10 (e.g., a retailer) of planogram compliance or other issues with the product 12 within the display shelf environment 100. In some implementations, the computing device 130 produces a planogram compliance report and then may communicate the planogram compliance report to the network 150 and/or server 160.

Figure 2:
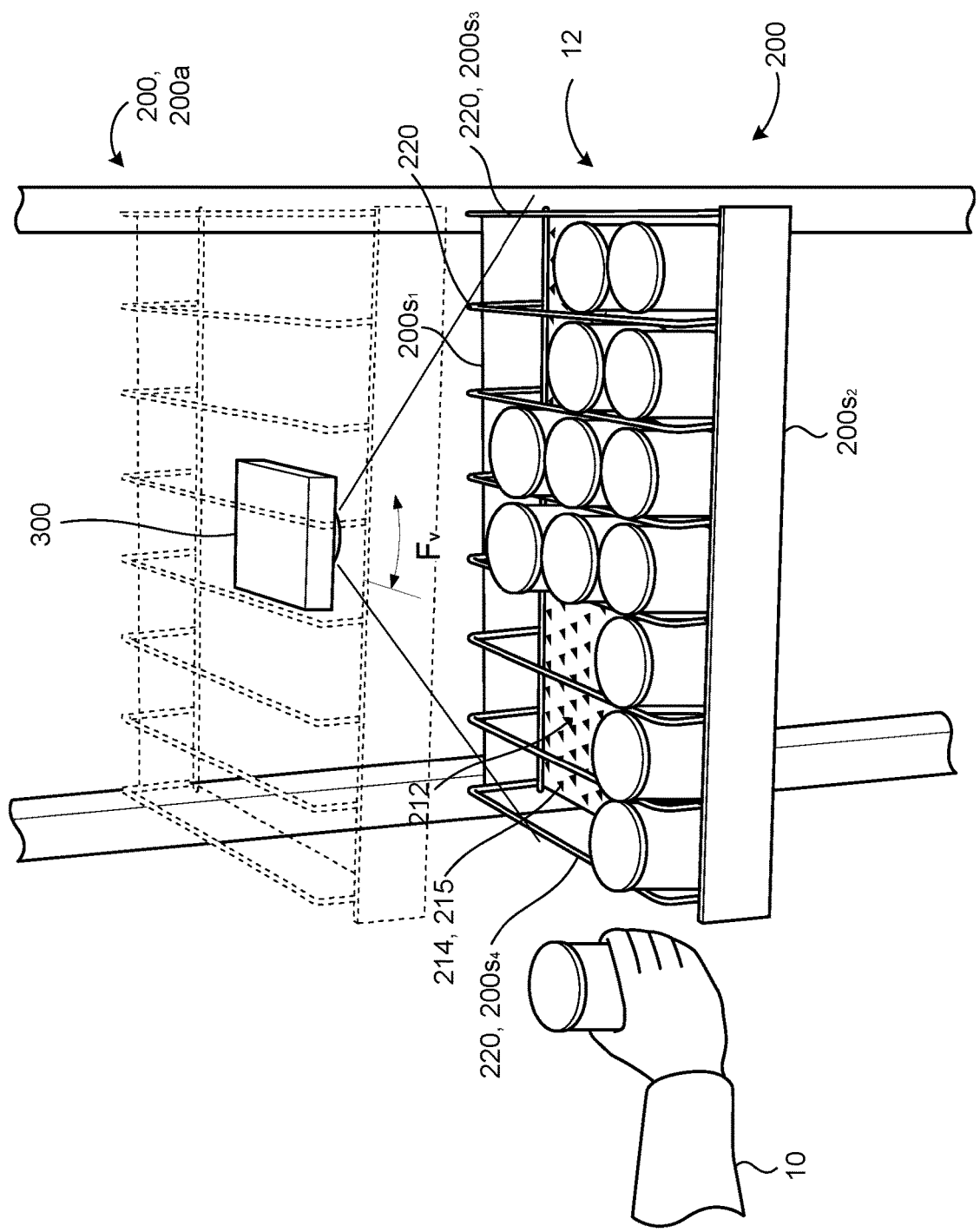
FIG. 2 is a perspective view of an example display shelf.

Referring to FIG. 2, the display shelf 200 includes at least a display shelf base 210 to support the product 12. The display shelf base 210 includes the top surface 212 with a pattern of features 214. The pattern of features 214 is defined by at least one feature 215. In some examples, the at least one feature 215 defines a polygonal shape. For example, with regards to FIG. 2, the at least one feature 215 is a triangle. Additionally or alternatively, the at least one feature 215 and the top surface 212 has a contrast of color (e.g., black and white, respectfully). In some examples, the display shelf 200 further includes at least one side $200_S$ to contain the product 12 within the display shelf 200. As an example, FIG. 2 illustrates a display shelf 200 with a rear side $200_{S1}$ and a front side $200_{S2}$. The display shelf 200 may also include shelf dividers 220 to guide the product 12 to the actual placement $P_A$. In some implementations, such as FIG. 2, the shelf dividers 220 also serve as lateral sides 220, $200_{S3-4}$ to constrain the product 12.

In some implementations, a retailer retrofits a shelving system to function as the display shelf environment 100. For example, retailers often use shelving units, such as gondola shelving, with pegboard display shelves and pegboard sides. A pegboard display shelf base of the pegboard display shelves includes pegboard shapes such as circles or polygons to anchor attachments. To retrofit these shelving systems, the computing device 130 may be programmed to receive and to interpret the pegboard shapes as the pattern of features 214.

Referring further to FIG. 2, the imaging device 300 is arranged to capture at least a portion of the top surface 212 of the display shelf 200 such that the imaging device 300 captures at least a portion of the pattern of features 214. In some examples, such as FIG. 2, the imaging device 300 is disposed above the display shelf 200. For example, the imaging device 300 may be mounted on an underside of another display shelf 200, 200a above the display shelf 200, the rear side $200_{S1}$ of the display shelf 200, or any support structure of the display shelf 200.

Figure 3A:
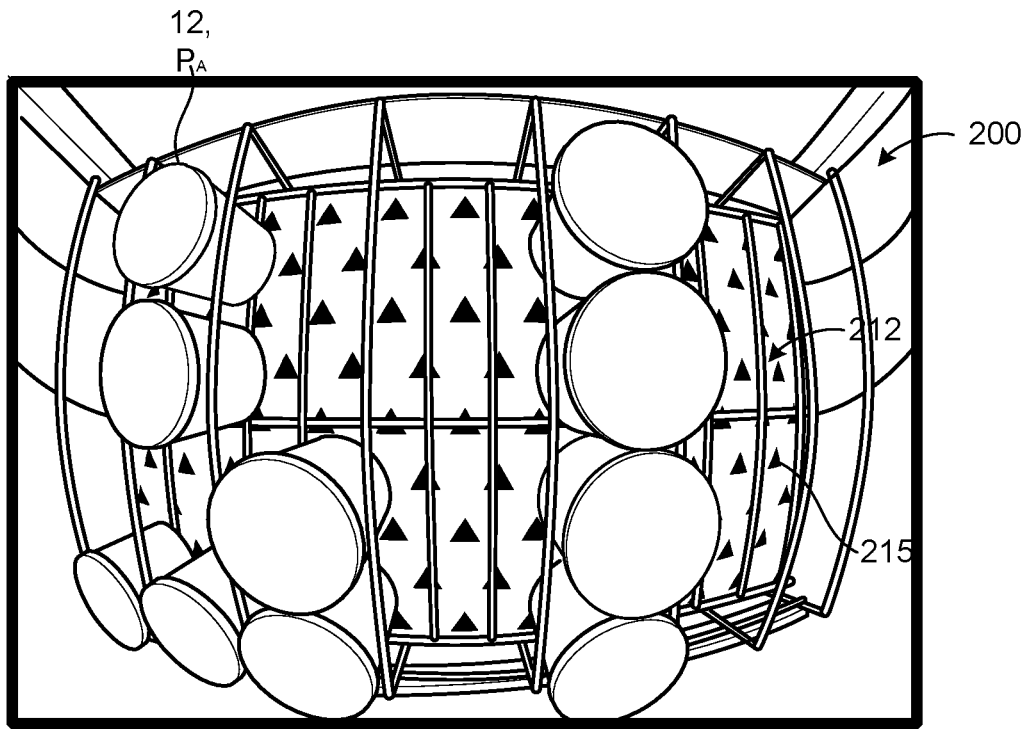
FIG. 3A is a perspective view of an example image from an imaging device of the display shelf of FIG. 2 having barrel distortion.
Figure 3B:
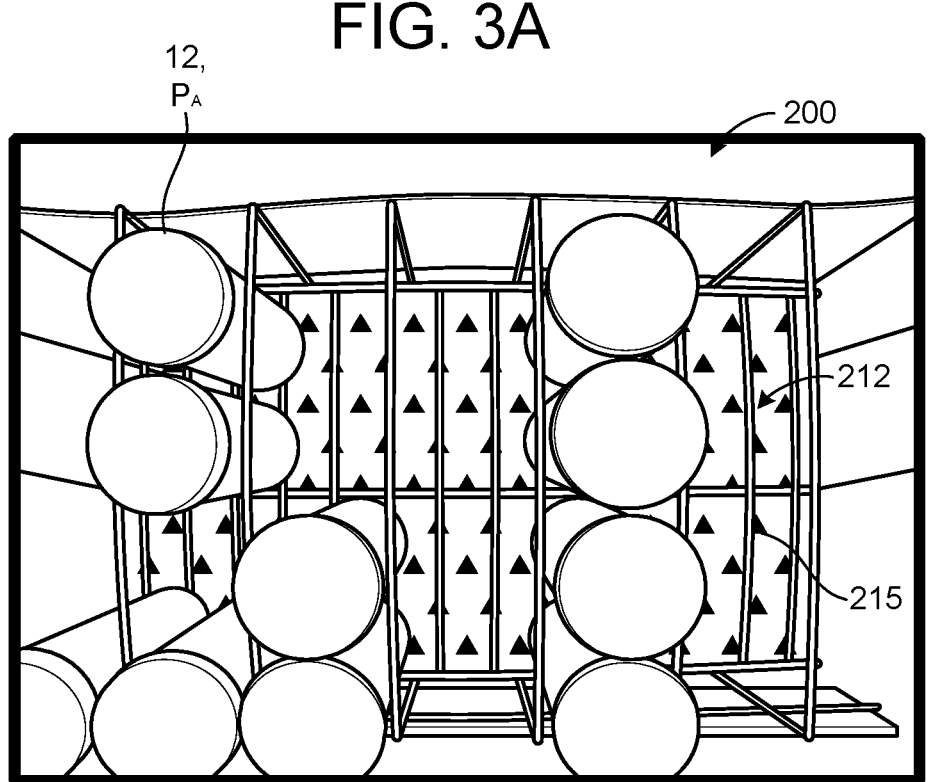
FIG. 3B is a perspective view of the image of FIG. 3A after an image correction routine.

FIGS. 3A and 3B are examples of at least one image 310 captured by the imaging device 300. The imaging device 300 may be a camera (e.g., video camera or a still camera) or a sensor or a combination of both a camera and a sensor. The imaging device 300 is configured to capture the at least one image 310 from the field of view $F_v$ of the imaging device 300. In some examples, to capture the display shelf 200 in the field of view $F_v$, the imaging device 300 uses a wide angle lens. As a result, the at least one image 310 captured by the imaging device 300 with the wide angle lens may have barrel distortion $V_b$. FIG. 3A provides an example of at least one image 310 having barrel distortion $V_b$. In some examples, the computing device 130 or the remote computer 170 corrects the barrel distortion $V_b$ by an image correction routine. The image correction routine may apply a barrel distortion correction filter to the at least one image 310 to correct for the barrel distortion $V_b$. With the image correction routine, elements of the display shelf environment 100, such as the display shelf 200, the product 12, actual placement of the product 12, the at least one feature 215, and/or the pattern of features 214, may be more recognizable by data processing routines than when subject to barrel distortion $V_b$. FIG. 3B provides an example of at least one image 310 with a corrected image $V_c$ from the image correction routine that illustrates how the elements of the display shelf environment 100 may be more recognizable by the data processing routines. For example, product 12 of the corrected image $V_c$ of FIG. 3B is less likely to be misinterpreted with regard to actual placement $P_A$ than product 12 within the at least one image 310 with barrel distortion $V_b$ such as FIG. 3A. Additionally or alternatively, the imaging device 300 may provide the user 10 with a real-time feed or a live feed of the product 12. For example, the display screen 110 or the remote computer 170 receives the live feed from the imaging device 300 or via the computing device 130 in communication with the imaging device 300. For security purposes, the live feed may require secured access such as a password or an encryption key.

FIGS. 4A-4D provide example images 310, 310a-d of the display shelf 200 captured over a period of time t by the image device 300. In some examples, the imaging device 300 is instructed to capture at least one image 310 at a discreet interval of time, such that the imaging device 300 has an image capture cycle. When the imaging device 300 captures the at least one image 310, the imaging device 300 may communicate the at least one image 310 for storage to the computing device 130, the server 160, or the remote computer 170. During storage, the at least one image 310 may be tagged with image information such as a shelf unit information (e.g., shelf serial number, shelf number, shelf location, etc.), date information (e.g., year, month, day), and/or a time stamp. FIGS. 4A-4D include at least a portion of the display shelf 200 with the product 12 forming product rows 12, 12a-g corresponding to each type of product separated by shelf dividers 220. In some examples, the at least a portion of the display shelf 200 includes the top surface 212 with the at least one feature 215 of a pattern of features 214.

Figure 4A:
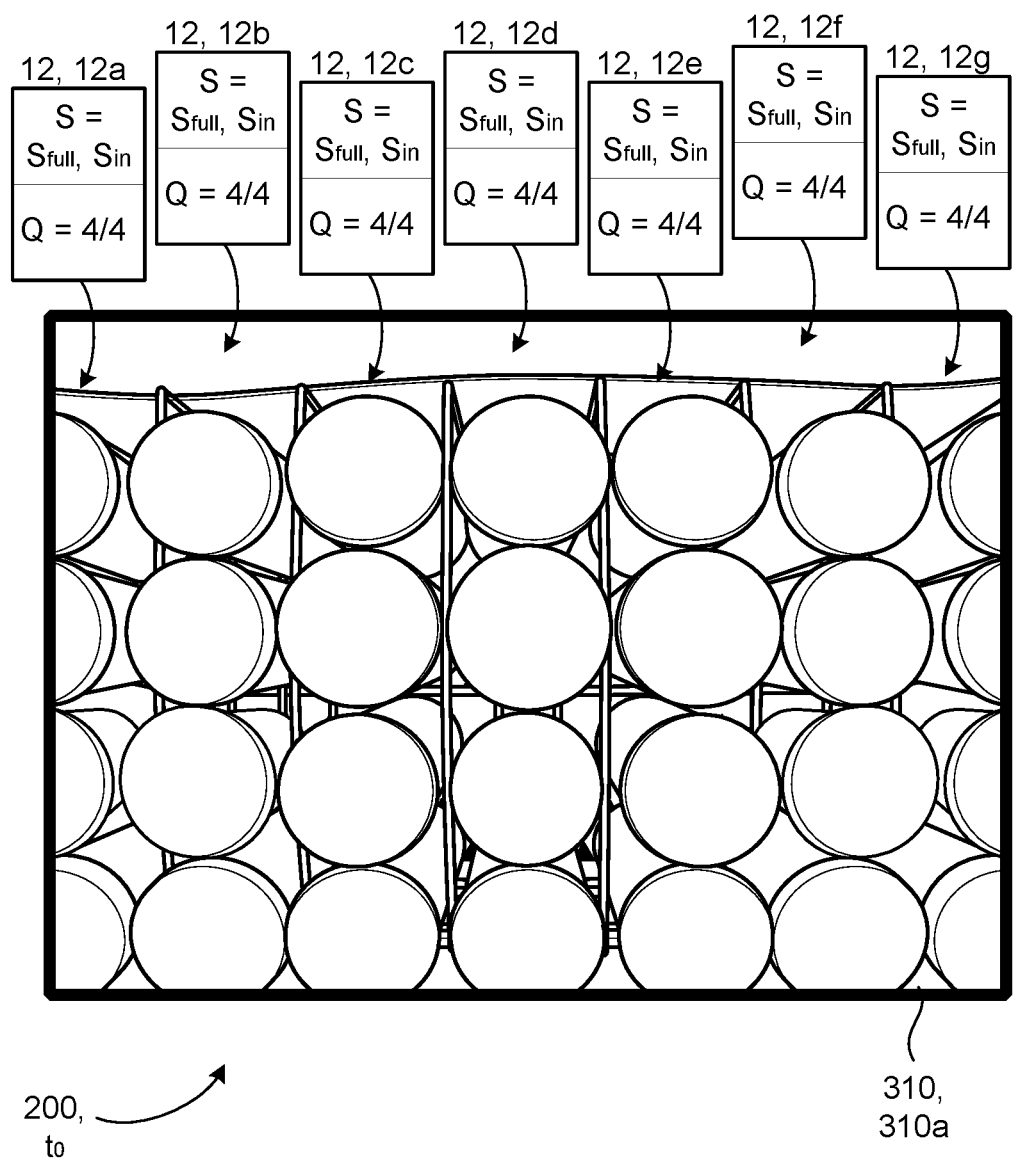
FIG. 4A-4D are top views of example display shelves with product.

FIG. 4A provides an image 310, 310a of the display shelf 200 having full stock $S_{full}$. FIG. 4A illustrates a first interval time to of a period of time t shortly after when the user 10 completely stocked the display shelf 200 with product 12. A method 600 of the display shelf environment 100 includes determining the stocking status S of the display shelf 200 based on the at least one image 310, such as the image 310, 310a. In some implementations, the stocking status S of the display shelf 200 is detailed, such that the stocking status S is defined by a percentage of the display shelf 200 with or without stock. In other examples, the stocking status S merely designates whether the product 12 of the display shelf 200 is in-stock $S_{in}$ or out-of-stock $S_{out}$. FIG. 4A is an example of the display shelf 200 having a stock status of in-stock $S_{in}$ or full stock $S_{full}$ as the image 310, 310a lacks at least one feature 215.

Figure 4B:
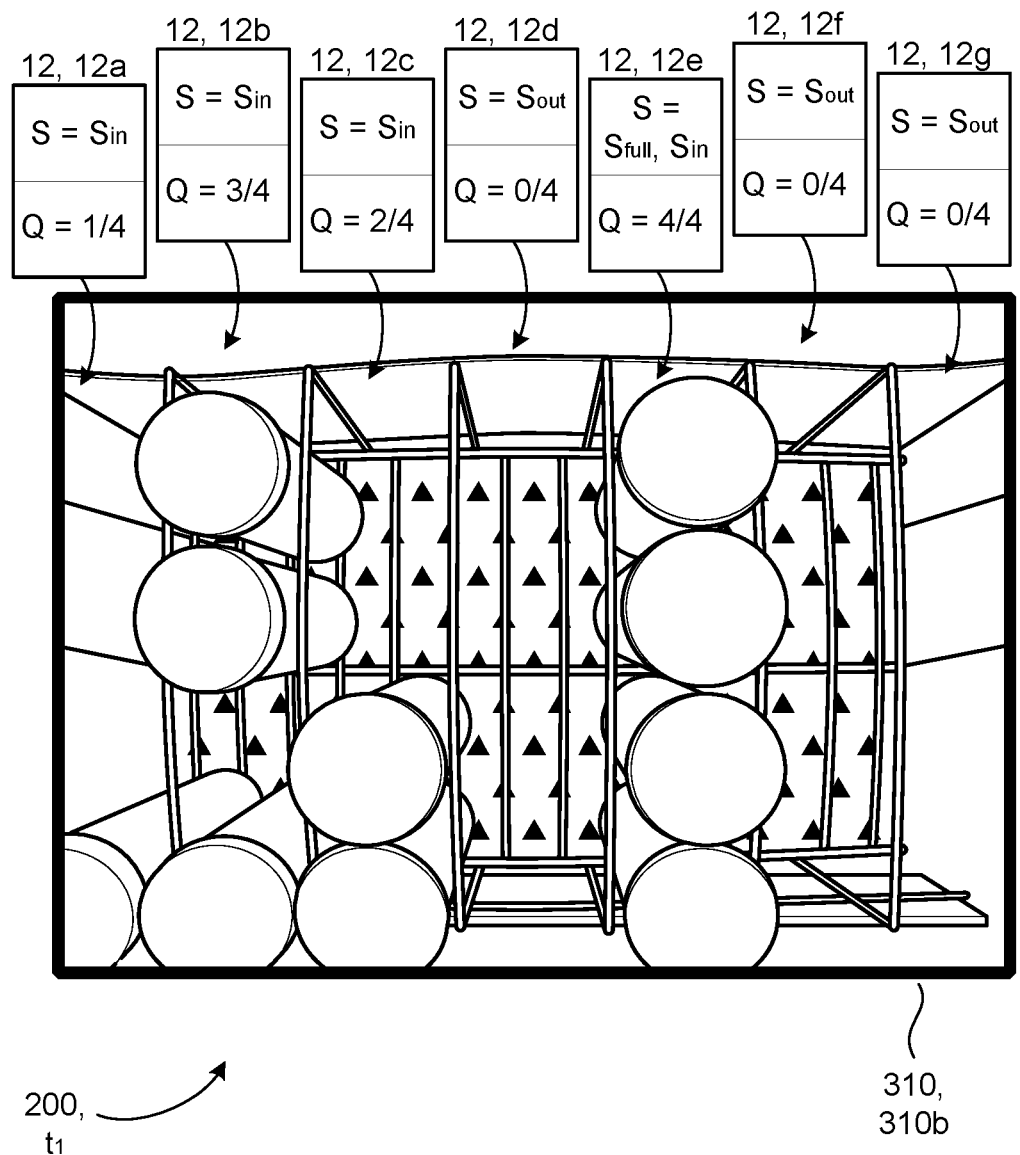

FIG. 4B provides an image 310, 310b of the display shelf 200 at a second interval of time $t_1$ of period of time t. With regards to the image 310, 310b, the method 600 includes communicating to a recipient (e.g., a client device) that the type of product 12 associated with product rows 12, 12d,f,g are out-of-stock $S_{out}$. The method 600 may also communicate quantitative stock information, such as a quantity Q of product 12 available or depleted from each product row 12, 12a-g. For example, a first product row 12, 12a has one product 12 available and three depleted. While, the fourth product row 12, 12d has none available (e.g., out-of-stock $S_{out}$) and four depleted.

Figure 4C:
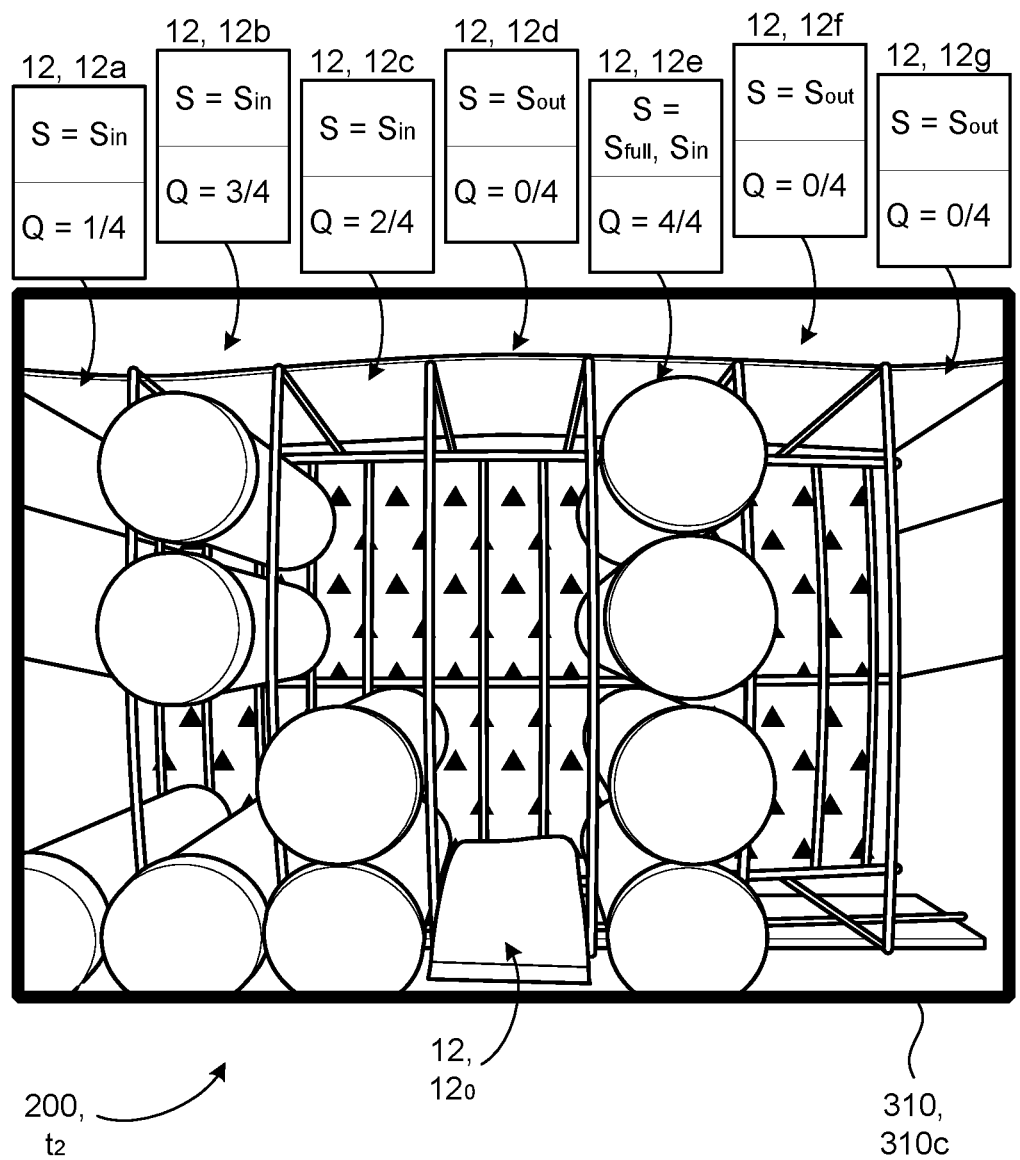

FIG. 4C provides an image 310, 310c of the display shelf 200 at a third interval of time $t_2$ of the period of time t. The image 310, 310c is nearly identical to the image 310, 310b except that the fourth product row 12, 12d includes a misplaced product 12, $12_o$. The method 600 includes identifying the misplaced product 12, $12_o$ and, in some examples, providing an alert or feedback of planogram compliance 620 regarding actual placement $P_A$ of the product 12.

Figure 4D:
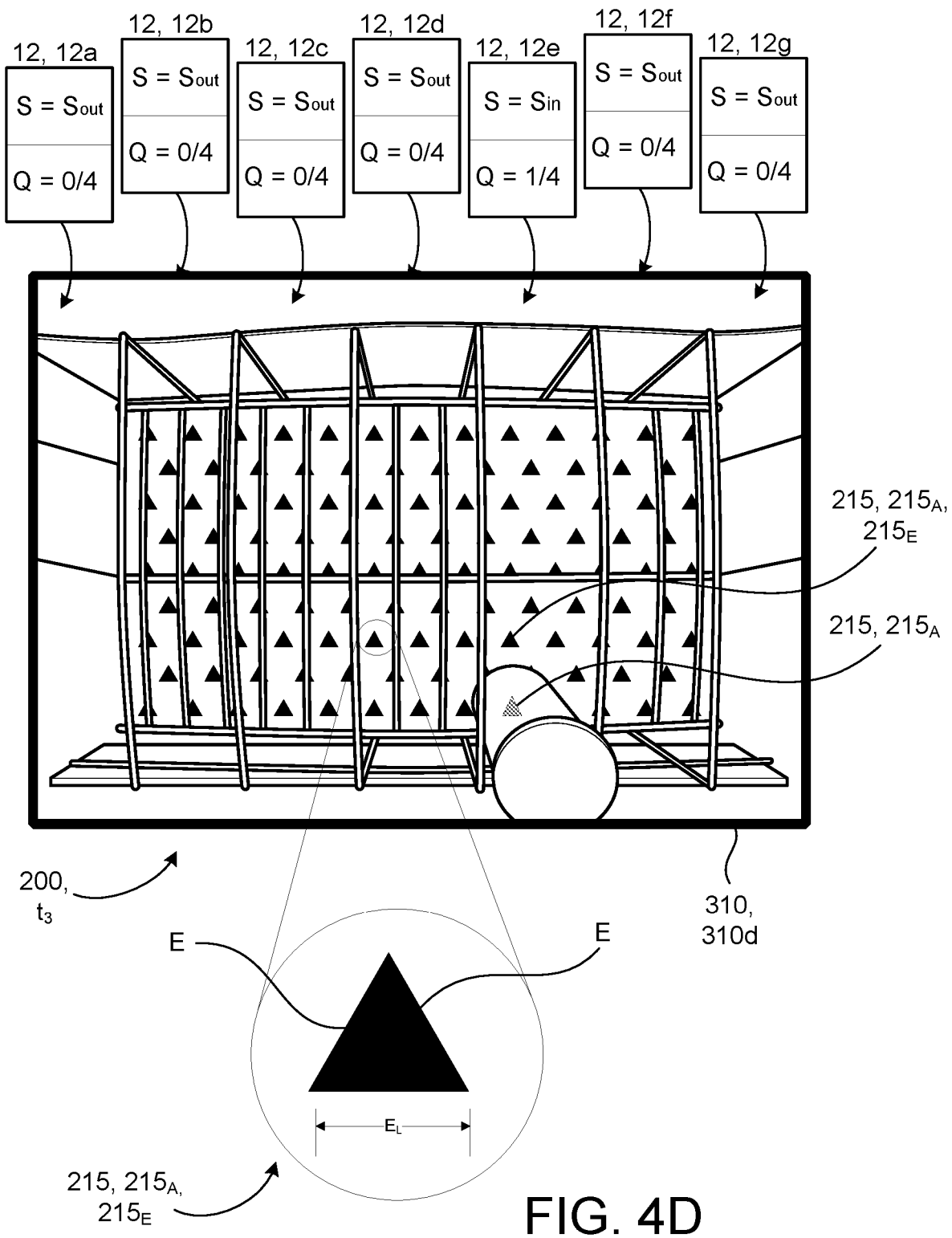

FIG. 4D provides an image 310, 310d of the display shelf 200 at a fourth interval of time $t_3$. The image 310, 310d depicts all products rows 12, 12a-g out-of-stock $S_{out}$, except a fifth product row 12, 12e, which has a single product 12 available with three depleted. When product 12 of the display shelf 200 is out-of-stock $S_{out}$, the method 600 is configured to communicate the stocking status S to the network 150.

Figure 5:
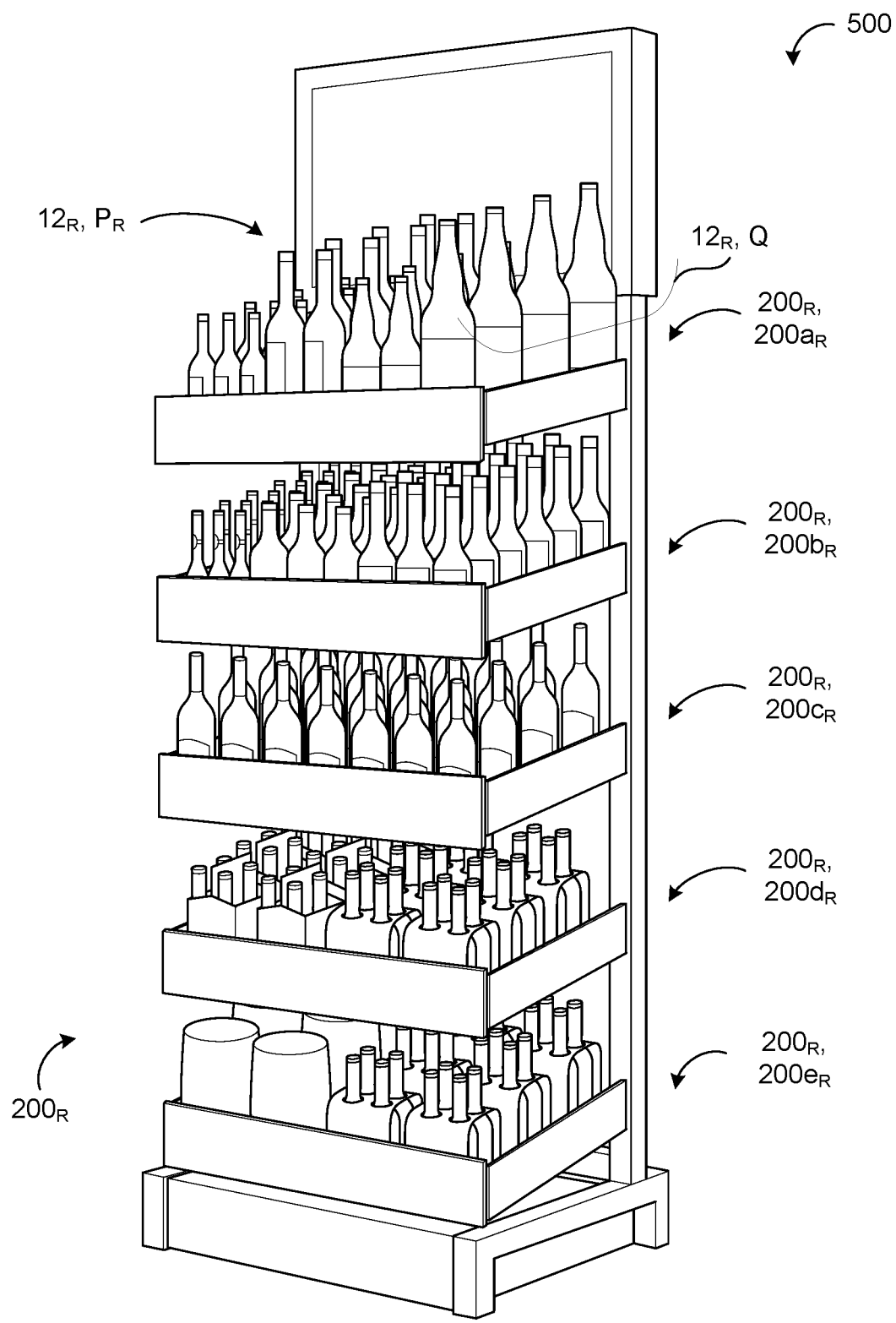
FIG. 5 is a prospective view of an example retail planogram.

FIG. 5 is an example planogram 500 of at least one representative display shelf $200_R$ corresponding to at least one display shelf 200. In some examples, such as when the display shelf 200 includes more than one display shelf 200, 200a-e, the planogram 500 includes more than one representative display shelf $200_R$, $200a_R$-$e_R$. On each representative display shelf $200_R$, the planogram 500 illustrates at least one representative product $12_R$ in a representative placement $P_R$ corresponding to the actual placement $P_A$ of the product 12 on the display shelf 200. For example, each representative product $12_R$ at a front of the representative display shelf corresponds to a product row of the display shelf 200 with a quantity Q. In some examples, the planogram 500 is a two-dimensional illustration of a front view of the representative display shelf $200_R$ such that the planogram 500 may indicate a quantity Q of the represented product $12_R$ as a note within the planogram 500. Additionally or alternatively, the planogram 500 is a perspective view of the representative display shelf $200_R$, such as the example shown in FIG. 5. With the perspective view, the quantity Q of the represented product $12_R$ may be visible by a depth of the representative product $12_R$.

Figure 6A:
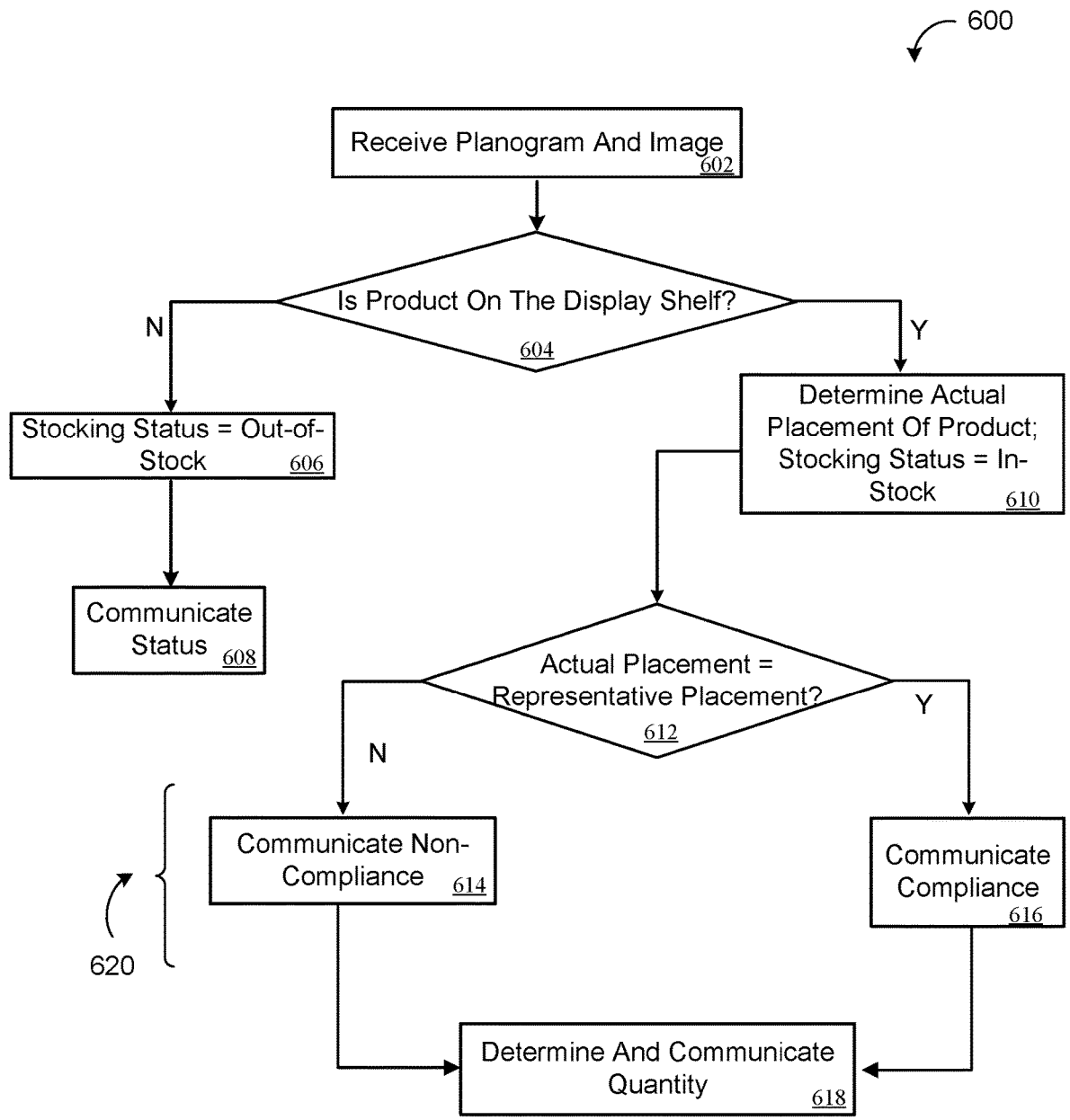
FIGS. 6A and 6B are example flowchart arrangements of operations for methods of product detection and/or planogram compliance.
Figure 6B:
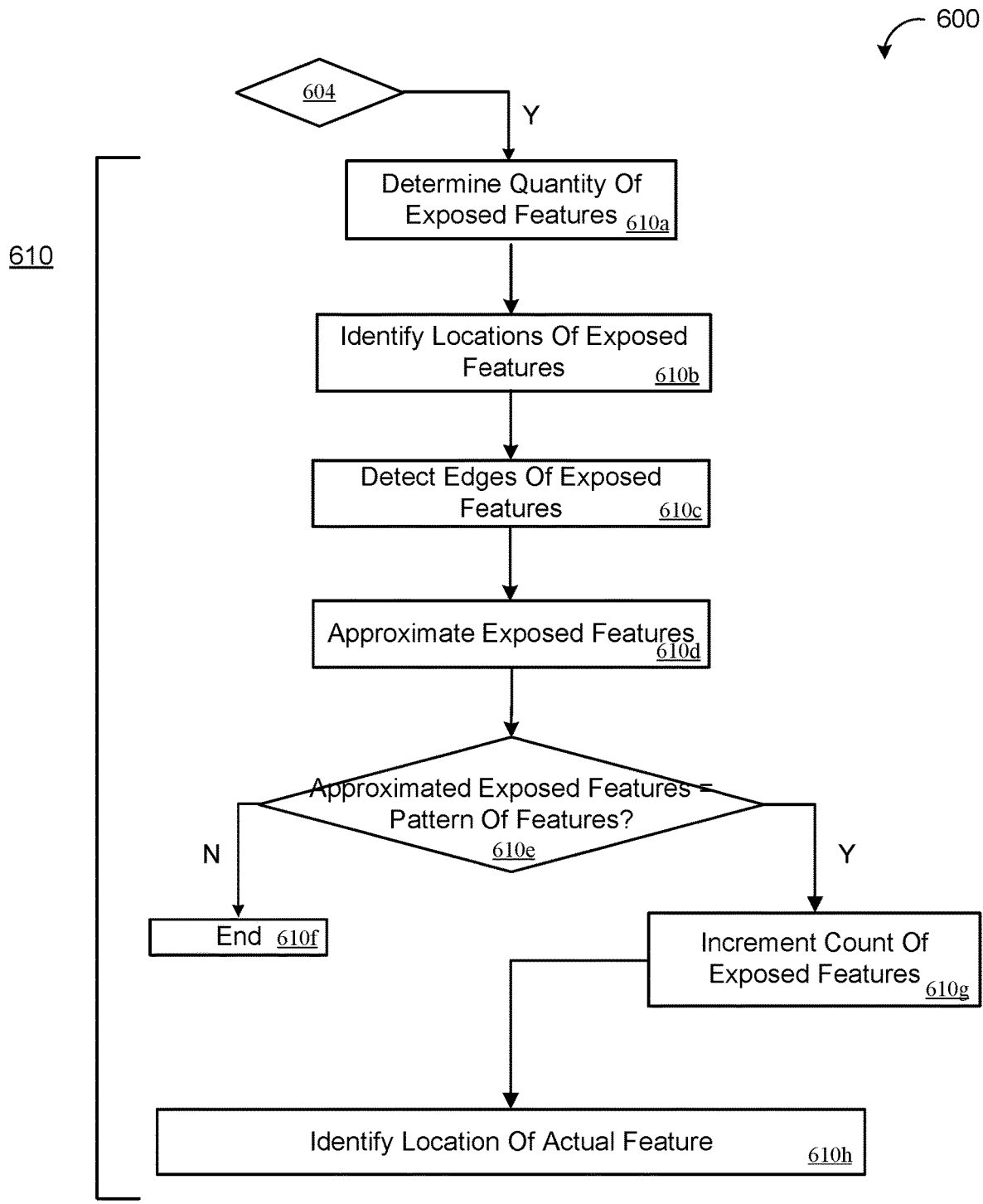

FIGS. 6A and 6B provide example arrangements of operations for a method 600 of product detection and/or planogram compliance. As described with respect to FIGS. 4A-4D, the method 600 may include providing at least quantitative stock information related to the product or compliance regarding actual placement $P_A$ of the product 12. At operation 602, the method 600 includes receiving the planogram 500 defining the representative placement $P_R$ of the product 12 on the display shelf 200 and at least one image 310 from the imaging device 300. The method 600 further includes, at operation 604, determining whether the product 12 is disposed on the display shelf 200 based on the at least one image 310. When the product 12 is disposed on the display shelf 200, the method 600 proceeds to operation 610. Otherwise, when the product 12 is not disposed on the display shelf 200, the method 600 proceeds to operation 606.

At operation 606, the method 600 includes determining that the product 12 is absent from the display shelf 200. Because the product 12 is absent from the display shelf 200 within the at least one image 310, the method 600 includes determining that the stocking status S of the product 12 is being out-of-stock $S_{out}$. The method 600 may include, at operation 608, communicating the out-of-stock $S_{out}$ stocking status S of the product 12 to the network 150.

The method 600 may include execution of operations 610 through 618, which may occur when the product 12 is disposed on the display shelf 200. If the product 12 is disposed on the display shelf 200, the method 600, at operation 610, includes determining the actual placement $P_A$ of the product 12 on the display shelf 200. If the product 12 is disposed on the display shelf 200, the method 600 may also, include determining the stocking status S of the product 12 as being in-stock $S_{in}$ and optionally communicating the stocking status S of the product 12 to the network 150. Additionally or alternatively, if the method 600 determines the actual placement $P_A$ of the product 12, the method 600 may include communicating the actual placement $P_A$ of the product 12 to the network 150.

At operation 612, the method 600 includes comparing the actual placement $P_A$ of the product 12 to the representative placement $P_R$ of the product 12 defined by the planogram 500. If the method 600 determines that the actual placement $P_A$ is the same as the representative placement $P_R$, the method 600 may proceed to operation 616. Otherwise, if the method 600 determines that the actual placement $P_A$ is different than the representative placement $P_R$, the method 600 may proceed to operation 614.

At both operations 614 and 616, the method 600 may communicate a planogram compliance 620 to the network 150. At operation 614, the method 600 communicates to the network 150 a planogram compliance 620 of noncompliant, because the actual placement $P_A$ is different than the representative placement $P_R$. At operation 616, the method 600 communicates to the network 150 a planogram compliance 620 of compliant, because the actual placement $P_A$ is the same as the representative placement $P_R$.

At operation 618, the method 600 may include determining the quantity Q of the product 12 on the display shelf 200. If the method 600 determines the quantity Q, the method 600 may communicate the quantity Q to the network 150. Operation 618 may occur at any point after the method 600 determines the display shelf 200 contains product 12.

FIG. 6B provides an example arrangements of operations for the method 600 to determine the actual placement $P_A$ of the product 12 disposed on the display shelf 200. At operation 610a, the method 600 includes determining a quantity Q of the exposed features $215_E$ on the top surface 212 of the display shelf 200 captured in the at least one image 310. At operation 610b, the method 600 includes identifying corresponding locations of the exposed features $215_E$ on the top surface 212 of the display shelf 200 captured in the at least one image 310. At operation 610c, the method 600 includes detecting edges E of the exposed features $215_E$ in the at least one image 310. At operation 610d, the method 600 may include determining an approximation of the exposed features $215_E$ based on the detected edges E of the exposed features $215_E$. At operation 610e, the method 600 may include comparing the approximation of exposed features $215_E$ to the pattern of features 214. When the approximation of exposed features $215_E$ corresponds to actual features $215_A$ of the pattern of features 214, the method 600 may proceed to operation 610g.

For each approximation of exposed features $215_E$ that corresponds to actual features $215_A$ of the pattern of features 214, the method 600 may include incrementing a count of the quantity Q of the exposed features $215_E$. Additionally or alternatively, for each approximation of exposed features $215_E$ that corresponds to actual features $215_A$ of the pattern of features 214, the method 600 may include identifying a corresponding location of the actual feature $215_A$ of the pattern of features 214.

In some examples, the method 600 includes executing a shelf space detection algorithm to determine whether the product 12 is disposed on the display shelf 200 and/or the actual placement $P_A$ of the product 12 on the display shelf 200. With the shelf space detection algorithm, the method 600 may include receiving inputs, such as the feature 215 of the pattern of features 214, a corresponding edge length $E_L$ of the feature 215, a feature approximation factor $A_F$, and corresponding tolerances for each input. If the method 600 executes without tolerances for each input, the method 600 may include receiving default tolerances for each input. In some examples, the method 600 receives the at least one image 310 and converts the at least one image 310 into a grayscale image to simplify edge detection for the method 600. In some implementations, the method 600 includes detecting edges E of the exposed features $215_E$ using simple chain approximation. With the input of the feature approximation factor $A_F$, the method 600 may include converting edges E from the detection determination to a closed feature to compare to the feature 215.

Additionally or alternatively, the method 600 includes eliminating any closed features that include either a greater number of edges E or a lesser number of edges E then the input feature 215. For example, in FIGS. 2-4, the feature 215 is a triangle with three edges and the method 600 may include eliminating closed features from the edge E detection determination that have more than three edges or less than three edges. Furthermore, if the method 600 includes receiving an input, such as the corresponding edge length $E_L$ of the feature 215, the method 600 may also include calculating an area corresponding to each closed feature 215. With the area of each closed feature 215, the method 600 may also include eliminating closed features 215 defined by areas without a correlation to an area of the feature 215. After limiting outlier closed features 215 determined by the detection of the method 600, the method 600 may include one or more operations that consider remaining closed features as possible valid detections of the feature 215 or exposed features $215_E$ of the pattern of features 214.

In some implementations, the method 600 includes outputting details related to the method 600 such that the details are accessible to the display shelf environment 100 (e.g., the computing device 130, the server 160, or the remote computer 170). The details may include: outputs of the method 600, such as actual placement $P_A$ of a product 12, planogram compliance 620, a quantity of exposed features $215_E$, a stocking status S of a product 12, or a location of an actual feature 215; or inputs of the method 600, such as the feature 215 of the pattern of features 214, a corresponding edge length $E_L$ of the feature 215, a feature approximation factor $A_F$, or corresponding tolerances for each input. The method 600 may include outputting the details in any data serialization format (e.g., Java script object notation (JSON), extensible markup language (XML), etc.).

Additionally or alternatively, the method 600 includes generating an optimal planogram $500_o$ for the product 12 within the display shelf environment 100. For example, the user 10 provides an input that includes shelf unit information regarding the display shelf environment 100. With shelf information provided, such as the shelf number and the shelf location, the method 600 may include ranking each display shelf 200 with a planogram priority. The method 600 may then include determining a rate of product depletion based on the actual placement $P_A$ of the product 12 within images 310 (e.g., 310, 310a-d) captured over a period of time t by the imaging device 300. According to the corresponding rate of product depletion, the method 600 may include assigning each type of product 12 within the display shelf environment 100 with an order of importance. For example, the method 600 may include assigning a first product 12 with a high rate of depletion over the period of time t a greater order of importance than a second product with a low rate of depletion over the period of time t (e.g., with respect to a threshold rate of depletion). With the order of importance and the planogram priority of each display shelf 200, the method 600 may include determining the optimal planogram 5000 for each type of product 12.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 7:
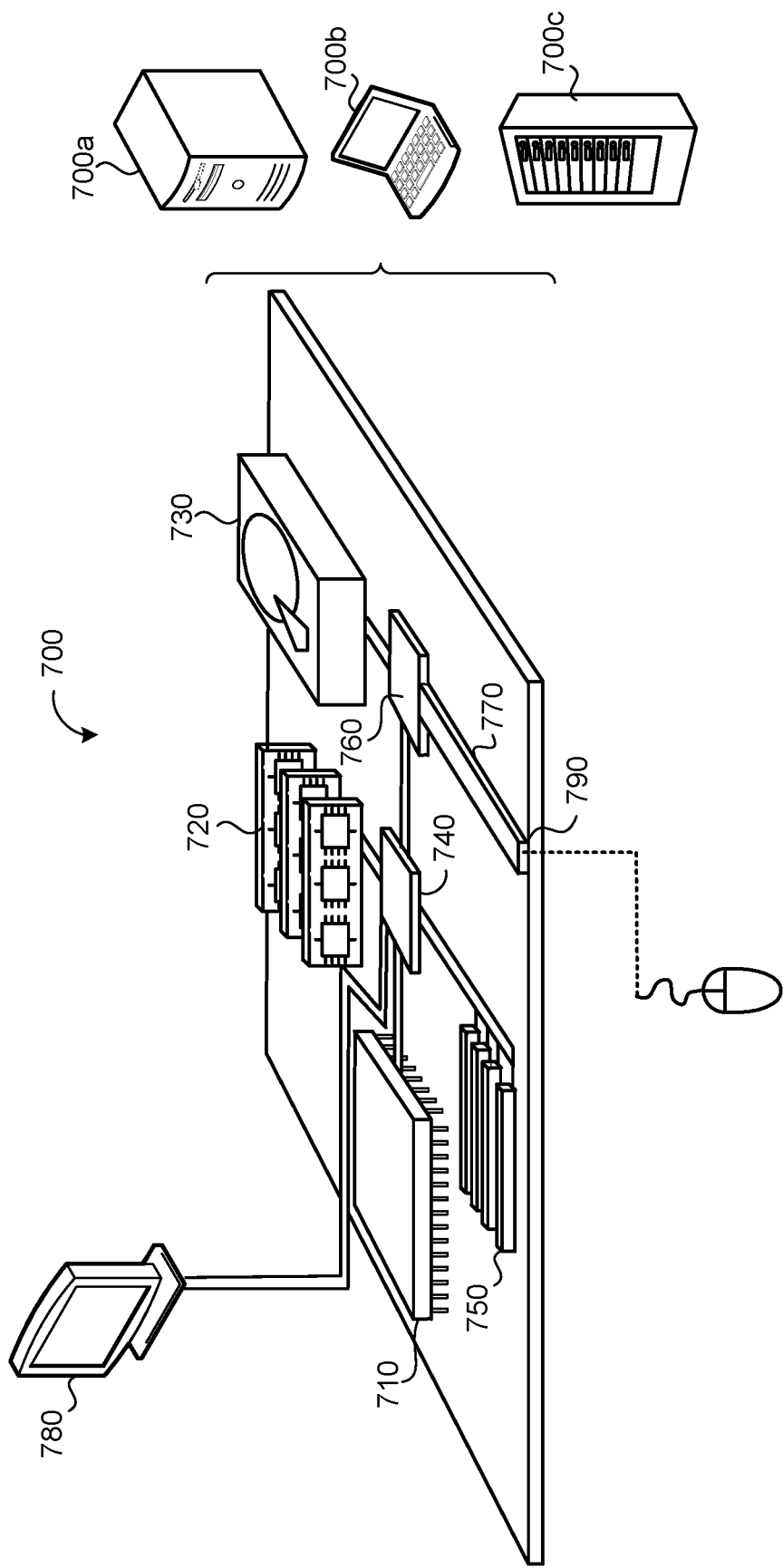
FIG. 7 is schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 580 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
  receiving, at data processing hardware, a plurality of images captured over time, each image of the plurality of images capturing a top surface of a display shelf, wherein the top surface supports product disposed thereon and defines a number of visual features, each visual feature defining a closed shape having specified area;
  determining, by the data processing hardware, for each of a first image captured at a first time and a second image captured at a second time later than the first time, a corresponding number of exposed features on the top surface of the display shelf by:
    detecting one or more feature edges in the respective image;
    converting the one or more detected feature edges to at least one closed feature;
    for each respective closed feature of the at least one closed feature:
      determining an area corresponding to the respective closed feature; and
      determining that the area corresponding to the respective closed feature sufficiently correlates to the specified area of a respective one of the visual features; and
      based on determining that the area corresponding to the respective closed feature sufficiently correlates to the specified area of the respective one of the visual features, comparing the respective closed feature to the closed shape corresponding to the respective one of the visual features;
  determining, by the data processing hardware, a depletion rate of the product disposed on the display shelf based on the corresponding number of exposed features on the top surface of the display shelf at the first time and the corresponding number of exposed features on the top surface of the display shelf at the second time; and
  communicating, by the data processing hardware, the depletion rate of the product to a network.

2. The method of claim 1, wherein the display shelf comprises a display screen disposed above the product on the display shelf, the display screen configured to depict media content.

3. The method of claim 2, wherein the media content comprises advertising content related to the depletion rate of the product.

4. The method of claim 2, wherein the media content comprises at least one image of the plurality of images.

5. The method of claim 1, further comprising executing, by the data processing hardware, an image-correction routine on the plurality of images, the image-correction routine correcting at least barrel distortion of the plurality of images.

6. The method of claim 1, further comprising, after receiving the plurality of images, converting, by the data processing hardware, the plurality of images into grayscale images.

7. The method of claim 1, further comprising:
  receiving, at the data processing hardware, display-shelf information comprising a location of the display shelf; and
  ranking, by the data processing hardware, the display shelf based on at least one of the depletion rate or the display-shelf information.

8. The method of claim 1, wherein the corresponding number of exposed features detected on the top surface of the display shelf is indicative of a corresponding percentage of the product stocked on the display shelf.

9. The method of claim 1, wherein the corresponding number of exposed features detected on the top surface of the display shelf is indicative of a corresponding quantity of the product disposed on the display shelf.

10. The method of claim 1, wherein receiving the plurality of images captured over time comprises receiving the plurality of images from an imaging device located above the display shelf and having a field of view arranged to capture the top surface of the display shelf.

11. The method of claim 10, wherein at least the second image captured by the imaging device at the second time captures at least a portion of the top surface of the display shelf with one or more exposed features.

12. The method of claim 1, wherein determining the depletion rate of the product disposed on the display shelf is further based on a period of time between the first time and the second time.

13. A system comprising:
  data processing hardware; and
  memory hardware in communication with the data processing hardware, the memory hardware storing instructions that when executed on the data processing hardware cause the data processing hardware to perform operations comprising:
    receiving a plurality of images captured over time, each image of the plurality of images capturing a top surface of a display shelf, wherein the top surface supports product disposed thereon and defines a number of visual features, each visual feature defining a closed shape having a specified area;
    determining, for each of a first image captured at a first time and a second image captured at a second time later than the first time, a corresponding number of exposed features on the top surface of the display shelf by:
      detecting one or more feature edges in the respective image;
      converting the one or more detected feature edges to at least one closed feature;
      for each respective closed feature of the at least one closed feature:
        determining an area corresponding to the respective closed feature; and
        determining that the area corresponding to the respective closed feature sufficiently correlates to the specified area of a respective one of the visual features; and
        based on determining that the area corresponding to the respective closed feature sufficiently correlates to the specified area of the respective one of the visual features, comparing the respective closed feature to the closed shape corresponding to the respective one of the visual features;

determining a depletion rate of the product disposed on the display shelf based on the corresponding number of exposed features on the top surface of the display shelf at the first time and the corresponding number of exposed features on the top surface of the display shelf at the second time; and communicating the depletion rate of the product to a network.

14. The system of claim 13, wherein the display shelf comprises a display screen disposed above the product on the display shelf, the display screen configured to depict media content.

15. The system of claim 14, wherein the media content comprises advertising content related to the depletion rate of the product.

16. The system of claim 14, wherein the media content comprises at least one image of the plurality of images.

17. The system of claim 13, wherein the operations further comprise executing an image-correction routine on the plurality of images, the image-correction routine correcting at least barrel distortion of the plurality of images.

18. The system of claim 13, wherein the operations further comprise, after receiving the plurality of images, converting the plurality of images into grayscale images.

19. The system of claim 13, wherein the operations further comprise:

receiving display-shelf information comprising a location of the display shelf; and ranking the display shelf based on at least one of the depletion rate or the display-shelf information.

20. The system of claim 13, wherein the corresponding number of exposed features detected on the top surface of the display shelf is indicative of a corresponding percentage of the product stocked on the display shelf.

21. The system of claim 13, wherein the corresponding number of exposed features detected on the top surface of the display shelf is indicative of a corresponding quantity of the product disposed on the display shelf.

22. The system of claim 13, wherein receiving the plurality of images captured over time comprises receiving the plurality of images from an imaging device located above the display shelf and having a field of view arranged to capture the top surface of the display shelf.

23. The system of claim 22, wherein at least the second image captured by the imaging device at the second time captures at least a portion of the top surface of the display shelf with one or more exposed features.

24. The system of claim 13, wherein determining the depletion rate of the product disposed on the display shelf is further based on a period of time between the first time and the second time.

* * * * *